(12) United States Patent
Lou et al.

(10) Patent No.: US 10,226,758 B2
(45) Date of Patent: Mar. 12, 2019

(54) METHOD FOR PREPARING CATALYST USED FOR PREPARING CHLORINE, CATALYST AND METHOD FOR PREPARING CHLORINE

(71) Applicant: Wanhua Chemical Group Co., Ltd., Yantai (CN)

(72) Inventors: Yinchuan Lou, Yantai (CN); Yang Lv, Yantai (CN); Guangquan Yi, Yantai (CN); Liangfeng Shao, Yantai (CN); Hongke Zhang, Yantai (CN); Weiqi Hua, Yantai (CN); Jiansheng Ding, Yantai (CN)

(73) Assignee: Wanhua Chemical Group Co., Ltd. (CN)

( * ) Notice: Subject to any disclaimer, the term of this patent is extended or adjusted under 35 U.S.C. 154(b) by 117 days.

(21) Appl. No.: 15/113,286

(22) PCT Filed: Jan. 27, 2014

(86) PCT No.: PCT/CN2014/071533
§ 371 (c)(1),
(2) Date: Jul. 21, 2016

(87) PCT Pub. No.: WO2015/109587
PCT Pub. Date: Jul. 30, 2015

(65) Prior Publication Data
US 2017/0001178 A1  Jan. 5, 2017

(30) Foreign Application Priority Data

Jan. 21, 2014 (CN) .......................... 2014 1 0027871

(51) Int. Cl.
| | | |
|---|---|---|
| *B01J 23/89* | (2006.01) | |
| *B01J 23/86* | (2006.01) | |
| *B01J 21/12* | (2006.01) | |
| *B01J 37/04* | (2006.01) | |
| *B01J 37/08* | (2006.01) | |
| *B01J 23/889* | (2006.01) | |
| *B01J 21/02* | (2006.01) | |
| *B01J 37/00* | (2006.01) | |
| *C01B 7/04* | (2006.01) | |
| *B01J 37/02* | (2006.01) | |
| *B01J 23/00* | (2006.01) | |
| *B01J 35/00* | (2006.01) | |
| *B01J 35/02* | (2006.01) | |

(52) U.S. Cl.
CPC ........... *B01J 23/8993* (2013.01); *B01J 21/02* (2013.01); *B01J 21/12* (2013.01); *B01J 23/002* (2013.01); *B01J 23/868* (2013.01); *B01J 23/8892* (2013.01); *B01J 37/0009* (2013.01); *B01J 37/0045* (2013.01); *B01J 37/0072* (2013.01); *B01J 37/0236* (2013.01); *B01J 37/04* (2013.01); *B01J 37/08* (2013.01); *B01J 37/088* (2013.01); *C01B 7/04* (2013.01); *B01J 35/002* (2013.01); *B01J 35/023* (2013.01); *B01J 2523/00* (2013.01)

(58) Field of Classification Search
CPC . B01J 21/02; B01J 21/12; B01J 23/868; B01J 23/8892; B01J 23/8993; B01J 37/0009; B01J 37/0045; B01J 37/04; B01J 37/08
See application file for complete search history.

(56) References Cited

U.S. PATENT DOCUMENTS

| | | | |
|---|---|---|---|
| 4,123,389 A | 10/1978 | Pieters et al. | |
| 4,774,070 A * | 9/1988 | Itoh | ........................... C01B 7/04 423/240 R |
| 4,828,815 A * | 5/1989 | Kiyoura | ................... B01J 23/26 423/502 |
| 5,034,209 A | 7/1991 | Ajioka et al. | |

(Continued)

FOREIGN PATENT DOCUMENTS

| | | |
|---|---|---|
| CN | 88101489 A | 10/1988 |
| CN | 101125297 A | 2/2008 |
| CN | 101559374 A | 10/2009 |
| CN | 102000583 A | 4/2011 |
| CN | 102847562 | 1/2013 |
| EP | 0184413 A2 | 6/1986 |
| EP | 2481478 A1 | 8/2012 |
| JP | 62270405 A | 11/1987 |

OTHER PUBLICATIONS

Supplementary European Search Report for Application No. EP14879293, dated Aug. 11, 2017.

*Primary Examiner* — Ngoc-Yen Nguyen
(74) *Attorney, Agent, or Firm* — Lerner, David, Littenberg, Krumholz & Mentlik, LLP

(57) ABSTRACT

The present invention relates to a method for preparing catalyst used for preparing chlorine by oxidizing hydrogen chloride. The method is mixing a slurry mainly containing boron and chromium with a slurry mainly containing copper, boron, alkali-metal elements, rare-earth elements, aluminum sol, silica sol, carrier and optionally other metal elements, the mixing temperature being not more than 100° C., and the residence time being not more than 120 minutes, the mixed slurry is successively treated with spray drying, high temperature calcination, so that the catalyst is obtained. The present invention also relates to the catalyst prepared through the method, use of the catalyst used in the process of preparing chlorine by oxidizing hydrogen chloride and a method for preparing chlorine by using the catalyst. The catalyst is used for preparing chlorine by oxidizing hydrogen chloride with oxygen or air in fluidized bed reactor.

12 Claims, No Drawings

(56) References Cited

U.S. PATENT DOCUMENTS

| | | | |
|---|---|---|---|
| 2002/0028173 A1* | 3/2002 | Hibi | B01J 23/462 423/502 |
| 2012/0203046 A1* | 8/2012 | Chae | B01J 29/85 585/638 |
| 2012/0238790 A1* | 9/2012 | Quinones | B01J 29/084 585/240 |
| 2013/0288884 A1 | 10/2013 | Yi et al. | |

OTHER PUBLICATIONS

International Search Report for Application No. PCT/CN2014/071533 dated Oct. 28, 2014.

* cited by examiner

METHOD FOR PREPARING CATALYST USED FOR PREPARING CHLORINE, CATALYST AND METHOD FOR PREPARING CHLORINE

FIELD OF THE INVENTION

The present invention belongs to the field of catalyst, and it mainly relates to a method for preparing catalysts used for preparing chlorine by oxidizing hydrogen chloride and the catalysts prepared by said method, and a method for preparing chlorine by using the catalysts.

BACKGROUND OF THE INVENTION

Chlorine is an important basic material in chemical industry, which is widely used in the industry of new material such as polyurethanes, organosilicones, epoxy resins, chlorinated rubbers, chlorinated polymers, chlorinated hydrocarbons, in industry of new energy such as the manufacturing of polysilicon, in industry of fine chemicals in life such as disinfectors, detergents, food additives, cosmetic additives, in industry of pesticides/pharmaceuticals such as synthetic glycerine, chlorobenzenes, chloroacetic acid, benzyl chloride, $PCl_3$, and in industries of paper making, textile, metallurgy and petroleum chemicals.

In most chlorine-consuming industries, there are two factors which constrain the use of chlorine: 1. in chlorine alkali industry, the electricity consumption for producing one ton chlorine is beyond 2000 kWh; 2. it is hard to deal with the by-product, hydrogen chloride (or hydrochloric acid). A good solution to the two problems is to prepare chlorine by oxidizing hydrogen chloride. According to the development in the recent decades, catalytic oxidation method (Deacon process) is the most effective solution.

In the reported catalysts for the oxidization of hydrogen chloride, active components are mainly metal elements such as copper, chromium, golden and ruthenium, etc. Among them, copper-based catalysts obtain lots of attention because of their lower cost. For example, Chinese patent application CN101125297A discloses a phosphoric acid treated-catalyst containing copper chloride, potassium chloride and cerium chloride, with silica as the carrier. For this catalyst, the yield of chlorine is 80.1% under the conditions that the molar ratio between hydrogen chloride and oxygen is 1:1, the temperature of fixed bed reactor is 400° C., the reaction pressure is 0.1 Mpa and the space velocity of hydrogen chloride is 0.8 $hr^{-1}$. Higher temperature is required for such catalysts to react, therefore, it is easy to lose the cupric chloride active component and to impair the service life of the catalysts. Chinese patent application CN101559374A discloses a cupric chloride, potassium chloride, manganese nitrate and cerium nitrate loaded catalyst, with silica gel, ReY molecular sieve as carriers, and the conversion of hydrogen chloride is 83.6% under the reaction conditions that the flow rate of hydrogen chloride and oxygen are both 200 ml/min, the amount of catalyst is 25 g and the reaction temperature is 380° C. However, this catalyst still has the disadvantages of loss of copper component, relatively low space velocity and so on. U.S. Pat. No. 4,123,389 discloses a copper-based catalyst with silica gel aluminium oxide or titania as carriers, and the amount of loading of the active component is between 25~70%. However, the preparation process of said catalysts needs to be carried out in organic solvents, thus resulting in serious pollution to the environment.

However, the hydrogen chloride oxidation process based on copper catalysts has not been industrialized so far, that is because the research of catalysts has not met the requirement of industrialization. Although progresses have been made continuously for hundreds of years, it is still required for the reaction temperature to reach up to 400-450° C. in order to achieve high conversion on copper catalysts. In such a temperature, the chlorides for each component in the catalysts show active mobility, resulting in the lost of components and thus in the deactivation of the catalysts. Chinese Patent application CN102000583A discloses a catalyst prepared by a two-step impregnation method. Said catalyst is a supported catalyst that mainly comprises copper, boron, alkali-metal elements, rare-earth metals and a few other metals, it achieves 85~89% chlorine yield in a fixed bed reactor, with great stability. However, the disadvantage of said method is: the reaction temperature in the fixed bed reactor is hard to control and temperature runaway is easy to happen, resulting in the lost of the active components of the catalyst by volatilization and influencing the service life of the catalyst and the quality of the chlorine. And because the medium in the reaction process includes hydrogen chloride, chlorine, oxygen, water and so on, which has a strong corrosivity under reaction conditions, only a few expensive nickel based alloys or pure nickel metal materials are suitable for the reactor. Moreover, as the structure of the fixed bed reactor is very complex, the amount of materials required is even larger, resulting in the extreme expensive cost of construction for the tubular fixed bed reactor and the industrialization is not economically sustainable.

As to fluidized bed reactor, since it is convenient to exchange heat and to add or remove a part of catalysts at any time, and there's fewer internal structural components, the problems during actual operation for fixed bed reactors mentioned above can be avoided or relieved. Although for years, internationally, detailed studies have been made to the hydrogen chloride catalytic oxidation process of fluidized bed reactor systems, including Shell-Chlor process, Benson process, Tsinghua University process etc., conditions for industrialization still have not been achieved. We used the composition disclosed in the Chinese patent application CN102000583A to formulate fluidized bed catalyst, and in the fluidized bed reactor, a good reaction effect was achieved initially, however, long-term and stable operation cannot be achieved like in fixed bed reactors. After studying, it has been found that the major reason is that the metal elements in the catalyst formed chloride intermediates by the reaction with hydrogen chloride or chlorine, and these chloride intermediates have melting points that are relatively low, thus they have strong mobility under reaction temperature, even appears to be melted or half-melted. As the reaction time goes on, a part of the active components accumulate on the surface of the catalysts, and the collisions between the catalyst particles might allow the formation of bridging between the particles, thus resulting in the cohesion between the catalysts. The cohesive particles will play a role of crystal nucleus, resulting in the accumulation of more particles and thus in agglomeration of the catalysts, then it will directly affect the fluidization state and condition in the bed, leading to the channeling of the bed, even a dead bed. Meanwhile, partial channeling will lead to temperature runaway of the bed and loss of the active components of the catalysts.

In conclusion, for the chlorine-related industry, HCl oxidation to produce chlorine will be an important step in the industry chain. A good solution to achieve and popularize such a process in a low cost manner is the combination of copper catalysts and a fluidized bed. And in between, the key challenge is to develop a catalyst with good activity, suitable mechanical strength and high stability to adapt the long-term-use requirement in the fluidized bed reactor industrial production.

SUMMARY OF THE INVENTION

Based on the above background, the object of the present invention is to provide a method for preparing catalysts used for preparing chlorine by oxidizing hydrogen chloride, and the catalysts prepared according to said method are suitable to use in fluidized bed reactors and have good activity, better mechanical strength and higher stability.

The technical solution of the present invention is as follows:

A method for preparing catalysts used for preparing chlorine by oxidizing hydrogen chloride, comprises:

mixing a slurry A with a slurry B under the condition of a mixing temperature being >X° C. and ≤100° C., and a residence time being ≤120 minutes to obtain a mixed slurry;

treating the mixed slurry with spray drying to obtain catalyst precursor particles; and calcining the catalyst precursor particles to obtain said catalysts, wherein, X is the highest value among the solidifying points of slurry A, slurry B and the mixed slurry; said slurry A is acidic and contains boron and chromium; slurry B contains copper, boron, alkali-metal elements, rare-earth elements, alumina sol, silica sol, carrier and optionally at least one of other metal elements selected from the group consisting of magnesium, calcium, barium, manganese, ruthenium and titanium.

Specifically, the preparation method is as follows:

At first, two kinds of slurries need to be prepared.

The first kind of slurry mainly contains boron and chromium, and we called it "slurry A" for short; The second kind of slurry mainly contains copper, boron, alkali-metal elements, rare-earth elements, alumina sol, silica sol, carrier and optionally at least one of other metal elements selected from the group consisting of magnesium, calcium, barium, manganese, ruthenium and titanium, and we called it "slurry B" for short.

Slurry A is formed by mixing boron-containing compound, chromium-containing compound and water. Wherein slurry A contains: 0.1~2 wt %, preferably 0.3~1 wt % of boron by weight of boron element; and 0.1~5 wt %, preferably 0.3~4 wt % of chromium by weight of chromium element, where all percentages by weight are based on the weight of slurry A. Said boron-containing compound is at least one of the compounds from the group consisting of boron trichloride, boron oxide, boric acid, chromium diboride, boron nitrate, boron nitrite, potassium borate and sodium borate; said chromium-containing compound is at least one of the compounds from the group consisting of chromium chloride, chromium nitrate, chromium trioxide, chromium diboride, dichromic acid, potassium dichromate, sodium dichromate, chromic acid, potassium chromate and sodium chromate.

A few substances that are insoluble might appear during preparation process of slurry A, which won't be beneficial to the following spray drying process and would easily result in the decrease of the strength of the catalyst produced. The content of the insoluble substances is required to be ≤0.3 wt %, preferably ≤0.1 wt %. Adding a certain amount of acid to slurry A can accelerate the insoluble substances to dissolve, and said acid can be one or two or more of hydrochloric acid, nitric acid, phosphoric acid and oxalic acid. However, if the acidity is too strong, the viscosity of the mixed slurry will increase rapidly during the mixing and even the mixed slurry would condense rapidly, at that time, a certain amount of base need to be added, and said base can be one or two or more of hydroxides of alkali-metal, carbonates of alkali-metal, bicarbonates of alkali-metal, phosphates of alkali-metal, diphosphates of alkali-metal, dihydric phosphates of alkali-metal and oxalates of alkali-metal, wherein the alkali-metal is preferably potassium. Slurry A should be acidic no matter acid is added or base is added, and the acidity of slurry A is measured by pH value. Under the condition that sufficient stirring and stable slurry are maintained, suitable pH value for slurry A is 0.1~6.0, preferably 0.3~3.0.

Slurry B contains: 2~7.5 wt % of copper by weight of copper element, 0.05~2.5 wt % of boron by weight of boron element, 1~3.5 wt % of alkali-metal elements by weight of alkali-metal elements, 1.5~5.5 wt % of rare-earth elements by weight of rare-earth elements, 0.1~15 wt %, preferably 0.1~5 wt % of alumina sol by weight of aluminum oxide, 0.1~25 wt %, preferably 0.1~10 wt % of silica sol by weight of silica, 5~75 wt %, preferably 15~50 wt % of carrier, 0~5 wt % of at least one of other metal elements from the group consisting of magnesium, calcium, barium, manganese, ruthenium and titanium, and the balance is water, where all percentages by weight are based on the weight of slurry B. Wherein said alkali-metal elements are potassium and/or sodium, said rare-earth element is at least one of the elements from the group consisting of cerium, lanthanum, praseodymium and neodymium, and said carrier is at least one of the carriers from the group consisting of molecular sieve, kaolin, kieselguhr, silica, alumina, titanium dioxide and zirconium dioxide.

Slurry B is prepared according to the composition disclosed in the Chinese patent application CN102000583A, the difference is adding a certain amount of alumina sol, silica sol and water. Alumina sol and silica sol can be condensed and solidified during the drying and calcination of the catalyst precursor, thus increasing the mechanical strength of the catalyst. The general process for preparing slurry B would be using metered deionized water to sufficiently dissolve the metered raw materials, then adding metered silica sol, alumina sol, carrier while stirring, then stirring sufficiently.

The slurry A and slurry B are stirred in the containers respectively, and the two kinds of slurry are mixed together after sufficiently stirred. In the mixing process, it is preferred to add slurry A slowly and continuously into the continuously-stirred slurry B, so that the mixed slurry would always be in the homogenous state, wherein the volume of slurry B is 5~20 times of the volume of slurry A. However, if the slurry obtained after the mixing of slurry A and B are stored too long, the viscosity would be too high, and the slurry would even condense, thus make it impossibility for spray drying. Therefore, the mixing temperature (the temperature during the process from the start of mixing until the start of spray drying) and the residence time (the time from the end of mixing until the start of spray drying) must be controlled strictly. Specifically, the mixing temperature is >X° C. and ≤100° C., wherein X represents the highest value among the solidifying points of slurry A, slurry B and the mixed slurry, and said residence time is ≤120 minutes. More specifically, when the mixing temperature is between 50~100° C., the residence time is ≤10 minutes, preferably 3~10 minutes; when the mixing temperature is between 30~50° C., the residence time is ≤30 minutes, preferably 10~25 minutes; when the mixing temperature is >X° C. and ≤30° C., the residence time is ≤120 minutes, preferably 20~100 minutes, especially preferably 40~70 minutes. In order to achieve a better mixing effect and uniformity of the residence time of the mixed slurry, the following operation method are preferred: metered slurry A is added continuously to the pipes used for delivering slurry B to the spray drying device, and disturbing or stirring is enhanced in the pipes that follow the delivery ones to allow sufficiently mixing before entering into the spray drying device, the residence time can be controlled by controlling the pipe volume after the mixing point of the two kinds of slurry, and by the feeding rates of slurry A and B and so on.

In slurry B, alumina sol and silica sol are relatively stable. When mixed with acidic slurry A, the acidity of slurry B will increase, and the sol will form gel. Gel is advantageous in increasing the cohesion strength between the active components, carriers of the catalyst and alumina, silica which are formed by sols during the following spray drying and calcination processes, so that the obtained catalysts have a better mechanical strength, shown as lower abrasion index of the catalysts. However, excessive gel would not only cause a too high viscosity of the slurry but even congealed of the slurry, which would result in difficulty in spray drying, but also result in the inhomogeneity of the components of the catalysts. Specifically, that is to say the alumina and silica formed by the alumina sol and silica sol would accumulate together but the cohesion of theirs with the active components and carrier of the catalysts would be weakened, leading to a worse mechanical strength of the resulted catalyst products. Therefore, besides the mixing temperature and the residence time should be well controlled, the amount should also be well controlled during the mixing of the two kinds of slurries.

The presence of iron and nickel would allow the catalysts to have strong water absorption during reaction process, therefore, a small amount of these elements would cause the catalysts to cohere together because of absorbing water in the process of using and start-up/shut-down, influencing the flowability of the catalysts. In order to avoid such condition, it is preferred that the total content of iron and nickel in the mixed slurry after the mixing of slurry A and slurry B is ≤0.05 wt %, preferably ≤0.02 wt %, based on the total weight of the mixed slurry. The impurities such as iron, nickel brought by the raw materials have to be controlled and the iron, nickel brought by the corrosion of the devices, pipes and valves shall also be prevented.

Elemental sulphur would deposit on the surface of the catalysts during the reaction process, and poison the catalysts, therefore, the content of elemental sulphur in the mixed slurry after the mixing of slurry A and slurry B is required to be ≤0.05 wt %, preferably ≤0.02 wt %. Elemental sulphur can be brought by various raw materials, including the afore mentioned various raw materials to prepare slurry A and slurry B; and it can be brought by the contamination of the devices and facilities contacted with slurry A and slurry B during preparation process.

Next, the mixed slurry is dried by spray drying device, after spray drying, the catalyst precursor particles are obtained with the range of particle size distribution of 10~180 μm, the average particle size of 40~100 μm, and the water content of 2~10 wt %. It is necessary to avoid these just dried particles to contact with any liquid, to avoid fracture of the particles resulted from wetting by the liquid, and to avoid cohesion by the effect of the liquid. From another aspect, in this step, most of the commercially available spray drying devices can be used, but different devices might need to be controlled by different parameters.

At last, the catalyst precursor particles obtained from spray drying are calcined under high temperature. The conditions for calcination are: the temperature of the calcinator is increased at the rate ≤50° C./min, the temperature of the catalyst precursor particles is increased to 450~750° C. for calcination, and the temperature is maintained at this range for 30 min~20 h to obtain the finished catalyst particles.

The catalysts obtained in the present invention are used for the process of preparing chlorine by hydrogen chloride catalytic oxidation, and the method can be specified as follows: the finished catalyst particles are added into fluidized bed reactors, and air and/or oxygen and/or nitrogen are used as the medium to allow the catalyst particles to stay in a good flow state, then the temperature of the reactor is increased to 250~400° C. gradually, and the air flow is adjusted to hydrogen chloride and oxygen. Because the reaction is exothermic, the temperature of the catalyst bed increases after inletting hydrogen chloride and oxygen, and the highest temperature (hot-spot temperature) in the reactor is controlled to be 320~500° C., preferably 350~450° C. by adjusting gradually the temperature of the heat medium.

All parts that might contact with the reaction medium in the fluidized bed reactor are made by materials that can resist the corrosion of chlorine, hydrogen chloride, oxygen, water etc. from ambient temperature to 500° C., and the materials can be but are not limited to nickel, high-nickel alloy (such as Inconel alloy). The length-diameter ratio of the fluidized bed reactor is 3~25. In the chlorine-preparation process, the process conditions are: the space velocity of hydrogen chloride is 0.05~1.5 h$^{-1}$, the molar ratio of hydrogen chloride and oxygen is 1~4, and the reaction pressure is from ordinary pressure to 5 atmospheric pressure (absolute pressure).

The advantages of the catalysts prepared by the method provided in the present invention are as follows: 80~85% average per pass conversion is achieved in the fluidized bed reactor; nearly no cohesion is found between catalyst particles after 1000 hours of reaction, and the catalysts still possess good flowability and activity, thus it can be seen that the catalysts prepared by the method of the present invention possess a good anti-cohesion property and a longer service life. Moreover, the catalysts prepared by the method of the present invention possess smaller abrasion index, indicating the catalysts have better mechanical strengths.

DETAILED DESCRIPTION OF THE INVENTION

The present invention will be further illustrated below with the combination of the examples. But the present invention is not limited to the listed examples; it should also include any other common changes within the extent of the claims.

The Test Method for the Conversion of Hydrogen Chloride:

In each example, during the test of the catalyst performance, it is sampled 2~3 times for each 24 h to analyze, and the average conversion in the whole operation process is treated as the conversion of the catalyst.

The test method for the conversion of hydrogen chloride each time is as follows:

(1) Testing Principles $Cl_2+2KI=2KCl+I_2$ $I_2+2Na_2S_2O_3=2NaI+Na_2S_4O_6$ $HCl+NaOH=NaCl+H_2O$ (2) Preparation and Calibration of 0.1 Mol/L $Na_2S_2O_3$ Solution About 6.2 g of $Na_2S_2O_3 \cdot 5H_2O$ is weighed and dissolved in a suitable amount of newly boiled and just cooled distilled water (to remove $O_2$ and $CO_2$ in the water), 0.05~0.1 g of $Na_2CO_3$ is added (to inhibit microorganism), and 250 mL of the solution is prepared and placed in a brown bottle and stored in dark; A calibration is performed after 1~2 weeks of storing.

0.15 g of $K_2Cr_2O_7$ (dried at 110° C. for 2 h) is weighed accurately in iodine flask, 10~20 mL of water is added to dissolve, and 2 g of KI and 10 mL of $H_2SO_4$ with weight concentration of 1 wt % are added and the iodine flask is well shaken and placed for 5 minutes, then 50 mL water is added for dilution; the $Na_2S_2O_3$ solution is used for titration until the solution turn into light yellow-green, then 2 mL of starch indicator is added, and $Na_2S_2O_3$ solution is again used for titration until the solution turns into light green from blue (the end point is the very light green of $Cr^{3+}$). 3 times of parallel calibration are performed and the average value is taken.

(3) Process of Sampling and Analyzing a) sampling: 250 mL sampling bottle is replaced with sample gas to be measured for 3 min (the gas entered from the bottom and come out from the top), making sure the sampling bottle is free of impurities. The sample gas in the sampling bottle is reacted sufficiently with the KI water solution with the weight concentration of 15 wt %, the $Cl_2$ in the sample gas is reacted with KI to produce $I_2$ (it is dissolved in the absorption liquid in the form of $I_3^-$, if $I_2$ precipitation appears, the result will not be accurate, then resampling is required), and hydrochloric acid water solution is formed after HCl is absorbed. Then titration is performed.

b) the titration of the $I_2$ ($I_3^-$) in the absorption liquid: 25.00 mL of absorption liquid is taken into 250 mL conical flask, 50 mL of distilled water is added for dilution, the prepared and calibrated $Na_2S_2O_3$ solution is used to titrate the absorption liquid until it turns into light yellow, then 2 mL of starch solution is added, titration is continued until the blue just disappear, and it is the end point. The volume of the $Na_2S_2O_3$ solution consumed in titration is recorded, the amount of $I_2$ ($I_3^-$) in the absorption liquid is calculated, and then the amount of $Cl_2$ in the sample gas to be measured is calculated.

c) the titration of the hydrochloric acid in the absorption liquid: 2~3 drops of phenolphthalein is added to the sample where the titration in step b) ended, the colorless liquid turns to red, and the red color does not change in half a minute (if the colorless liquid did not turns to red, then if it is sure that the experiment process is right, then it indicates that there's no hydrochloric acid in the absorption liquid). Then the prepared and calibrated NaOH standard solution is used for titration until it turns into colorless, and it is the end of the titration. The volume of the NaOH standard solution consumed in the titration is recorded, and the amount of $H^+$ in the absorption liquid can be calculated, then the amount of HCl in the sample gas to be measured is calculated.

(4) the conversion Cony of the hydrogen chloride in the sample is calculated:

$$Conv = \frac{a \cdot b \times 10^{-3}}{a \cdot b \times 10^{-3} + c \cdot d \times 10^{-3}} \times 100\%$$

wherein:

a represents the concentration of $Na_2S_2O_3$ solution, mol/L;

b represents the volume of the $Na_2S_2O_3$ solution consumed during titration, mL;

c represents the concentration of NaOH standard solution, mol/L;

d represents the volume of the NaOH standard solution consumed during titration, mL.

The Method for the Measurement of the Abrasion Index of the Catalyst (Straight Tube Method):

The measurement of the abrasion index is carried out according to the method in Q/TSH3490909-2006 of the standard "The measurement of the abrasion index of the catalytic cracking catalyst, straight tube method".

The Measurement of the Particle Size Distribution of the Catalysts:

The measurement is carried out with Sympatec laser particle size analyzer, with 95% industrial alcohol as the dispersant.

VMD: volume mean diameter; unless otherwise indicated, the average particle size of the catalysts in the present invention all denotes volume mean diameter.

SMD: surface area mean diameter.

The Preparation of Slurry A:

2 kg of boric acid, 5 kg of potassium dichromate were weighed and added to 100 kg of deionized water, then the pH was adjusted to 0.3 by 2 mol·L$^{-1}$ of hydrochloric acid, the solution was stirred sufficiently under ambient temperature for 3 hours, and slurry A-1 was obtained with 2.25 g of contents that were insoluble.

2 kg of boric acid, 10 kg of chromium trioxide were weighed and added to 100 kg of deionized water, then the pH was adjusted to 3.0 by 0.1 mol·L$^{-1}$ of KOH, the solution was stirred sufficiently under ambient temperature for 3 hours, and slurry A-2 was obtained with 4.93 g of contents that were insoluble.

5 kg of boric acid, 2 kg of chromic chloride hexahydrate were weighed and added to 100 kg of deionized water, then the pH was adjusted to 1.0 by 1 mol·L$^{-1}$ of nitric acid, the solution was stirred sufficiently under ambient temperature for 3 hours, and slurry A-3 was obtained with 1.71 g of contents that were insoluble.

The Preparation of Slurry B:

35 kg of copper chloride dihydrate, 10 kg of potassium chloride, 18 kg of cerium nitrate hexahydrate, 3 kg of boric acid, 18 kg of lanthanum nitrate hexahydrate were added to 200 kg of deionized water and were stirred until completely dissolved, then 2 kg of alumina sol with the concentration of 20 wt % (Zi Bo Jin Qi Chemical Technology Co. Ltd, A20, the same below), 4 kg of silica sol with the concentration of 20 wt % (Shan Dong Bal Si Te material Co. Ltd, N20, the same below), 100 kg of inert alumina powder were added then sufficiently stirred for 2 hours under ambient temperature to obtain slurry B-1.

25 kg of copper chloride dihydrate, 10 kg of potassium chloride, 22 kg of cerium nitrate hexahydrate, 2 kg of boric acid, 16 kg of lanthanum nitrate hexahydrate, 1 kg of manganous nitrate solution with the concentration of 50 wt %, 0.5 kg of ruthenium trichloride were added to 200 kg of deionized water and were stirred until completely dissolved, then 2 kg of alumina sol, 4 kg of silica sol, 100 kg of inert alumina powder were added then sufficiently stirred for 2 hours under ambient temperature to obtain slurry B-2.

30 kg of copper chloride dihydrate, 8 kg of potassium chloride, 15 kg of cerium nitrate hexahydrate, 2 kg of boric acid, 10 kg of lanthanum nitrate hexahydrate, 0.5 kg of manganous nitrate solution with the concentration of 50 wt %, 0.5 kg of anhydrous calcium chloride were added to 200 kg of deionized water and were stirred until completely dissolved, then 2 kg of alumina sol, 4 kg of silica sol, 100 kg of inertalumina powder were added then sufficiently stirred for 2 hours under ambient temperature to obtain slurry B-3.

Example 1

Preparation of the Catalyst:

Under ambient temperature (about 25° C.), 3 L of slurry A-1 was added slowly and continuously into 18 L of vigorously stirred slurry B-1, the mixing temperature was 33° C., the residence time was about 15 mins, the mixed slurry was fed into a centrifugal spray drying tower by a two-screw pump at the rate of 15 L/h, and a cyclone separator and a bag-type dust collector were used to collect the materials from the spray drying tower. The materials collected by the cyclone separator were calcined with muffle furnace, the heating rate of the muffle furnace was 2° C./min, the temperature for calcination was 500° C., and the calcination time was about 1 h, then 8.6 kg of finished catalyst were obtained after cooling.

After analyzing, the mean particle size of the catalyst was 56.1 μm, VMD/SMD=1.3, and the abrasion index was 1.1%.

The Test of the Catalyst Performance:

1 kg of the catalyst was placed into a fluidized bed reactor with an internal diameter of 30 mm, a height of 700 mm, the catalyst bed was preheated to 280° C. by the air that had been preheated to 300° C., then 4 L/min of hydrogen chloride gas and 2 L/min of oxygen were inlet, the reaction pressure was adjusted to 0.3 MPa (absolute pressure), the hot-spot temperature was adjusted to 400~420° C., and the reaction continued for 1000 hrs. The detailed information was recorded in table 1.

Example 2

Preparation of the Catalyst:

Under ambient temperature (about 25° C.), 1 L of slurry A-2 was added slowly and continuously into 20 L of vigorously stirred slurry B-2, the mixing temperature was 32° C., the residence time was about 15 mins, then the spray drying, cyclone separating, bag-type dust collecting, and calcination were carried out under the same process conditions as that in example 1, and 8.1 kg of finished catalyst was obtained after cooling.

After analyzing, the mean particle size of the catalyst was 53.4 μm, VMD/SMD=1.2, and the abrasion index was 1.6%.

The Test of the Catalyst Performance:

The test of the catalyst performance was carried out as in example 1, and the detailed information was recorded in table 1.

Example 3

Preparation of the Catalyst:

Under ambient temperature (about 25° C.), 2 L of slurry A-3 was added slowly and continuously into 20 L of vigorously stirred slurry B-3, the mixing temperature was 33° C., the residence time was about 15 mins, then the spray drying, cyclone separating, bag-type dust collecting, and calcination were carried out under the same process conditions as that in example 1, and 9.0 kg of finished catalyst was obtained after cooling.

After analyzing, the mean particle size of the catalyst was 55.3 μm, VMD/SMD=1.2, and the abrasion index was 1.7%.

The Test of the Catalyst Performance:

The test of the catalyst performance was carried out as in example 1, and the detailed information was recorded in table 1.

Example 4

Preparation of the Catalyst:

Under ambient temperature (about 25° C.), 3 L of slurry A-1 was added slowly and continuously into 18 L of vigorously stirred slurry B-1, the mixing temperature was 25° C., the residence time was about 45 mins, then the spray drying, cyclone separating, bag-type dust collecting, and calcination were carried out under the same process conditions as that in example 1, and 8.9 kg of finished catalyst was obtained after cooling.

After analyzing, the mean particle size of the catalyst was 53.7 μm, VMD/SMD=1.3, and the abrasion index was 2.1%.

The Test of the Catalyst Performance:

The test of the catalyst performance was carried out as in example 1, and the detailed information was recorded in table 1.

Example 5

Preparation of the Catalyst:

Under ambient temperature (about 25° C.), 3 L of slurry A-1 was added slowly and continuously into 18 L of vigorously stirred slurry B-1, the mixing temperature was 67° C., the residence time was about 8 mins, then the spray drying, cyclone separating, bag-type dust collecting, and calcination were carried out under the same process conditions as that in example 1, and 8.8 kg of finished catalyst was obtained after cooling.

After analyzing, the mean particle size of the catalyst was 57.3 μm, VMD/SMD=1.4, and the abrasion index was 1.7%.

The Test of the Catalyst Performance:

The test of the catalyst performance was carried out as in example 1, and the detailed information was recorded in table 1.

Comparative Example 1

Preparation of the Catalyst:

Under ambient temperature (about 25° C.), 20 L of slurry B-1 at the temperature of 32° C. was subjected to spray drying, cyclone separating, bag-type dust collecting, and calcination that were carried out under the same process conditions as that in example 1, and 8.7 kg of finished catalyst was obtained after cooling.

After analyzing, the mean particle size of the catalyst was 41.7 μm, VMD/SMD=1.2, and the abrasion index was 9.5%.

The Test of the Catalyst Performance:

The test of the catalyst performance was carried out as in example 1, when the reaction lasted for 560 hrs, the pressure of the reactor bed increased, the temperatures of each reaction zone were not as consistent as before, the reaction was ended, the reactor was detached, and it is found that there was serious agglomeration of the catalysts. The detailed information was recorded in table 1.

Comparative Example 2

Preparation of the Catalyst:

Under ambient temperature (about 25° C.), 20 L of slurry B-2 at the temperature of 26° C. was subjected to spray drying, cyclone separating bag-type dust collecting, and calcination that were carried out under the same process conditions as that in example 1, and 8.4 kg of finished catalyst was obtained after cooling.

After analyzing, the mean particle size of the catalyst was 42.2 μm, VMD/SMD=1.3, and the abrasion index was 7.9%.

The Test of the Catalyst Performance:

The test of the catalyst performance was carried out as in example 1, when the reaction lasted for 420 hrs, the pressure of the reactor bed increased, the temperatures of each reaction zone were not as consistent as before, the reaction was ended, the reactor was detached, and it is found that there was serious agglomeration of the catalysts. The detailed information was recorded in table 1.

Comparative Example 3

Preparation of the Catalyst:

Under ambient temperature (about 25° C.), 20 L of slurry B-3 at the temperature of 73° C. was subjected to spray drying, cyclone separating, bag-type dust collecting, and calcination that were carried out under the same process conditions as that in example 1, and 8.4 kg of finished catalyst was obtained after cooling.

After analyzing, the mean particle size of the catalyst was 45.4 μm, VMD/SMD=1.3, and the abrasion index was 13.2%.

The Test of the Catalyst Performance:

The test of the catalyst performance was carried out as in example 1, when the reaction lasted for 620 hrs, the pressure of the reactor bed increased, the temperatures of each reaction zone were not as consistent as before, the reaction was ended, the reactor was detached, and it is found that there was serious agglomeration of the catalysts. The detailed information was recorded in table 1.

Comparative Example 4

Preparation of the Catalyst:

Under ambient temperature (about 25° C.), 2 L of slurry A-1 was added slowly and continuously into 20 L of vigorously stirred slurry B-1, the mixing temperature was 85° C., the residence time was about 15 mins, then the spray drying, cyclone separating, bag-type dust collecting, and calcination were carried out under the same process conditions as that in example 1, and 4.8 kg of finished catalyst was obtained after cooling. Wherein on the surface of the spray drying tower, a large amount of catalyst precursors were attached.

After analyzing, the mean particle size of the catalyst was 80.7 μm, VMD/SMD=3.3, and the abrasion index was 3.5%.

The Test of the Catalyst Performance:

The test of the catalyst performance was carried out as in example 1, the reaction lasted for 5 hrs, and the detailed information was recorded in table 1.

Comparative Example 5

Preparation of the Catalyst:

Under ambient temperature (about 25° C.), 2 L of slurry A-1 was added slowly and continuously into 20 L of vigorously stirred slurry B-1, the mixing temperature was 34° C., the residence time was about 45 mins, then the spray drying, cyclone separating, bag-type dust collecting, and calcination were carried out under the same process conditions as that in example 1, and 5.2 kg of finished catalyst was obtained after cooling. Wherein on the surface of the spray drying tower, a large amount of catalyst precursors were attached.

After analyzing, the mean particle size of the catalyst was 72.1 μm, VMD/SMD=2.6, and the abrasion index was 4.2%.

The Test of the Catalyst Performance:

The test of the catalyst performance was carried out as in example 1, the reaction lasted for 5 hrs, and the detailed information was recorded in table 1.

Comparative Example 6

Preparation of the Catalyst:

Under ambient temperature (about 25° C.), 2 L of slurry A-1 was added slowly and continuously into 20 L of vigorously stirred slurry B-1, the mixing temperature was 23° C., the residence time was about 165 min, then the spray drying, cyclone separating, bag-type dust collecting, and calcination were carried out under the same process conditions as that in example 1, and 3.9 kg of finished catalyst was obtained after cooling. Wherein on the surface of the spray drying tower, a large amount of catalyst precursors were attached.

After analyzing, the mean particle size of the catalyst was 92.3 μm, VMD/SMD=3.2, and the abrasion index was 3.9%.

The Test of the Catalyst Performance:

The test of the catalyst performance was carried out as in example 1, the reaction lasted for 5 hrs, and the detailed information was recorded in table 1.

Comparative Example 7

Preparation of the Catalyst:

Under ambient temperature (about 25° C.), 2 kg of iron nitrate nonahydrate was added into slurry B-1 and was completely dissolved by stirring to obtain slurry B-1-1; 3 L of slurry A-1 was added slowly and continuously into 18 L of vigorously stirred slurry B-1-1, the mixing temperature was 25° C., the residence time was about 45 mins, then the spray drying, cyclone separating, bag-type dust collecting, and calcination were carried out under the same process conditions as that in example 1, and 8.7 kg of finished catalyst was obtained after cooling.

After analyzing, the mean particle size of the catalyst was 53.4 μm, VMD/SMD=1.3, and the abrasion index was 2.2%.

The Test of the Catalyst Performance:

The test of the catalyst performance was carried out as in example 1, and the detailed information was recorded in table 1.

Comparative Example 8

Preparation of the Catalyst:

Under ambient temperature (about 25° C.), 1.5 kg of nickel nitrate hexahydrate was added into slurry B-1 and was completely dissolved by stirring to obtain slurry B-1-2; 3 L of slurry A-1 was added slowly and continuously into 18 L of vigorously stirred slurry B-1-2, the mixing temperature was 25° C., the residence time was about 45 mins, then the spray drying, cyclone separating, bag-type dust collecting, and calcination were carried out under the same process conditions as that in example 1, and 8.9 kg of finished catalyst was obtained after cooling.

After analyzing, the mean particle size of the catalyst was 53.6 μm, VMD/SMD=1.3, and the abrasion index was 2.1%.

The Test of the Catalyst Performance:

The test of the catalyst performance was carried out as in example 1, and the detailed information was recorded in table 1.

Comparative Example 9

Preparation of the Catalyst:

Under ambient temperature (about 25° C.), 1.5 kg of potassium sulphate was added into slurry B-1 and was completely dissolved by stirring to obtain slurry B-1-3; 3 L of slurry A-1 was added slowly and continuously into 18 L of vigorously stirred slurry B-1-3, the mixing temperature was 25° C., the residence time was about 45 mins, then the spray drying, cyclone separating, bag-type dust collecting, and calcination were carried out under the same process conditions as that in example 1, and 8.7 kg of finished catalyst was obtained after cooling.

After analyzing, the mean particle size of the catalyst was 53.9 μm, VMD/SMD=1.3, and the abrasion index was 1.9%.

The Test of the Catalyst Performance:

The test of the catalyst performance was carried out as in example 1, and the detailed information was recorded in table 1.

The invention claimed is:

1. A method for preparing catalysts used for preparing chlorine by oxidizing hydrogen chloride, comprising the steps of:
    mixing a slurry A with a slurry B under the condition of a mixing temperature being >X° C. and ≤100° C., and a residence time being ≤120 minutes to obtain a mixed slurry;
    treating the mixed slurry with spray drying to obtain catalyst precursor particles; and
    calcining the catalyst precursor particles to obtain the catalysts,
    wherein, X° C. is the highest value among the solidifying points of the slurry A, the slurry B and the mixed slurry; the slurry A is acidic and contains boron and chromium; the slurry B contains copper, boron, alkali-metal elements, rare-earth elements, alumina sol, silica sol, carrier and optionally at least one of other metal elements selected from the group consisting of magnesium, calcium, barium, manganese, ruthenium and titanium.

2. The method according to claim 1, wherein the slurry A is formed by mixing boron-containing compound, chromium-containing compound and water; based on the weight of slurry A, the slurry A contains: 0.1~2 wt % boron by weight of boron element; and 0.1~5 wt % chromium by weight of chromium element.

TABLE 1

| | Information of slurry | | | Information of mixing | | Information of the catalysts | | | Catalyst performance | |
|---|---|---|---|---|---|---|---|---|---|---|
| | | | | | | | Average | | | |
| | A | B | B/A Volume ratio | Mixing temperature □ | Residence time Mins | Abrasion index wt % | particle size μm | VMD/ SMD | Mean conversion % | agglomeration |
| Example 1 | A-1 | B-1 | 6 | 33 | 15 | 1.1 | 56.1 | 1.3 | 83.4 | None within 1000 hrs |
| Example 2 | A-2 | B-2 | 20 | 32 | 15 | 1.6 | 53.4 | 1.2 | 82.3 | None within 1000 hrs |
| Example 3 | A-3 | B-3 | 10 | 33 | 15 | 1.7 | 55.3 | 1.2 | 82.7 | None within 1000 hrs |
| Example 4 | A-1 | B-1 | 6 | 25 | 45 | 2.1 | 53.7 | 1.3 | 82.2 | None within 1000 hrs |
| Example 5 | A-1 | B-1 | 6 | 67 | 8 | 1.7 | 57.3 | 1.4 | 80.8 | None within 1000 hrs |
| Comparative example 1 | — | B-1 | — | 32 | — | 9.5 | 41.7 | 1.2 | 82.7 | Agglomeration appeared at 560 hrs |
| Comparative example 2 | — | B-2 | — | 26 | — | 7.9 | 42.2 | 1.3 | 81.1 | Agglomeration appeared at 420 hrs |
| Comparative example 3 | — | B-3 | — | 73 | — | 13.2 | 45.4 | 1.3 | 81.1 | Agglomeration appeared at 620 hrs |
| Comparative example 4 | A-1 | B-1 | 10 | 85 | 15 | 3.5 | 80.7 | 3.3 | 82.1 | * |
| Comparative example 5 | A-1 | B-1 | 10 | 34 | 45 | 4.2 | 72.1 | 2.6 | 83.2 | |
| Comparative example 6 | A-1 | B-1 | 10 | 23 | 165 | 3.9 | 92.3 | 3.2 | 82.6 | |
| Comparative example 7 | A-1 | B-1-1 | 6 | 25 | 45 | 2.2 | 53.4 | 1.3 | 81.6 | ** |
| Comparative example 8 | A-1 | B-1-2 | 6 | 25 | 45 | 2.1 | 53.6 | 1.3 | 82.4 | |
| Comparative example 9 | A-1 | B-1-3 | 6 | 25 | 45 | 1.9 | 53.9 | 1.3 | 68.5 | * |

In the above table, B-1-1 contains about 0.06 wt % of Fe; B-1-2 contains about 0.06 wt % of Ni; B-1-3 contains about 0.06 wt % of S;

*: long-term evaluation was not made;

**: open placement, agglomeration appeared within 100 hrs; the catalysts that were not agglomerate weren't agglomerate within the 1000 hrs reaction process but agglomerated right after the reaction ended.

3. The method according to claim 1, wherein the pH value of the slurry A is 0.1~6.0.

4. The method according to claim 1, wherein, based on the weight of the slurry A, the content of insoluble substances is ≤0.3 wt %.

5. The method according to claim 1, wherein, based on the weight of the slurry B, the slurry B contains:
- by weight of copper element, 2~7.5 wt % of copper;
- by weight of boron element, 0.05~2.5 wt % of boron;
- by weight of alkali-metal elements, 1~3.5 wt % of alkali-metal elements;
- by weight of rare-earth elements, 1.5~5.5 wt % of rare-earth elements;
- by weight of aluminum oxide, 0.1~15 wt % of alumina sol;
- by weight of silica, 0.1~25 wt % of silica sol;
- 5·75 wt % of carrier;
- 0~5 wt % of other metal elements; and
- the balance is water.

6. The method according to claim 5, wherein the alkali-metal elements are potassium and/or sodium; the rare-earth element is at least one of the elements selected from the group consisting of cerium, lanthanum, praseodymium and neodymium; the carrier is at least one of the carriers selected from the group consisting of molecular sieve, kaolin, kieselguhr, silica, alumina, titanium dioxide and zirconium dioxide.

7. The method according to claim 1, wherein, when the mixing temperature is between 50~100° C., the residence time is ≤10 minutes; when the mixing temperature is between 30~50° C., the residence time is ≤30 minutes; when the mixing temperature is >X° C. and ≤30° C., the residence time is ≤120 minutes, wherein X is the highest value among the solidifying points of slurry A, slurry B and the mixed slurry.

8. The method according to claim 1, wherein the volume ratio between slurry B and slurry A is 5~20.

9. The method according to claim 2, wherein the boron-containing compound is at least one of the compounds selected from the group consisting of boron trichloride, boron oxide, boric acid, chromium diboride, boron nitride, boron nitrite, potassium borate and sodium borate; the chromium-containing compound is at least one of the compounds selected from the group consisting of chromium chloride, chromium nitrate, chromium trioxide, chromium diboride, dichromic acid, potassium dichromate, sodium dichromate, chromic acid, potassium chromate and sodium chromate.

10. The method according to claim 1, wherein the calcination is carried out at the temperature of 450~750° C. for 30 mins~20 hrs.

11. The method according to claim 2, wherein the pH value of slurry A is 0.1~6.0.

12. The method according to claim 2, wherein, based on the weight of slurry A, the content of insoluble substances is ≤0.3 wt %.

* * * * *